US011363012B1

(12) United States Patent
Chhabra et al.

(10) Patent No.: US 11,363,012 B1
(45) Date of Patent: Jun. 14, 2022

(54) SYSTEM AND METHODS FOR USING ROLE CREDENTIALS ASSOCIATED WITH A VM INSTANCE

(71) Applicant: Amazon Technologies, Inc., Seattle, WA (US)

(72) Inventors: Jasmeet Chhabra, Sammamish, WA (US); Rebecca Claire Weiss, Vienna, VA (US); Eric Robert Northup, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/588,904

(22) Filed: Sep. 30, 2019

(51) Int. Cl.
*H04L 9/40* (2022.01)
*H04L 9/32* (2006.01)

(52) U.S. Cl.
CPC .......... *H04L 63/083* (2013.01); *H04L 9/3247* (2013.01); *H04L 63/0428* (2013.01)

(58) Field of Classification Search
CPC .. H04L 63/083; H04L 9/3247; H04L 63/0428
See application file for complete search history.

(56) References Cited

U.S. PATENT DOCUMENTS

| | | | | |
|---|---|---|---|---|
| 9,729,524 B1* | 8/2017 | Brandwine | ............ | H04L 9/3247 |
| 9,754,116 B1* | 9/2017 | Roth | .................... | G06F 21/6218 |
| 9,887,975 B1* | 2/2018 | Gifford | .................. | H04L 63/126 |
| 10,782,990 B1 | 9/2020 | Suarez et al. | | |
| 2007/0233540 A1* | 10/2007 | Sirota | .................... | H04L 63/105 |
| | | | | 705/7.25 |
| 2007/0234410 A1* | 10/2007 | Geller | ................ | G06Q 20/3821 |
| | | | | 726/8 |
| 2012/0297200 A1* | 11/2012 | Thom | .................. | G06F 21/6209 |
| | | | | 713/189 |
| 2018/0183578 A1* | 6/2018 | Chakrabarti | .......... | H04L 9/3247 |
| 2020/0067907 A1* | 2/2020 | Avetisov | ............ | H04L 9/0825 |
| 2020/0274859 A1* | 8/2020 | Melo | ...................... | H04L 9/0861 |
| 2021/0011984 A1* | 1/2021 | Renke | .................... | G06F 21/552 |

* cited by examiner

*Primary Examiner* — Matthew Smithers
(74) *Attorney, Agent, or Firm* — Davis Wright Tremaine LLP

(57) ABSTRACT

A customer in a computing resource provider environment, running an application on a VM instance, uses role credentials to request access to one or more web services. The request is forwarded to an enclave associated with the VM instance such that the enclave digitally signs the request and access to the one or more web services is provided.

20 Claims, 10 Drawing Sheets

SYSTEM AND METHODS FOR USING ROLE CREDENTIALS ASSOCIATED WITH A VM INSTANCE

CROSS-REFERENCE TO RELATED APPLICATION

This application incorporates by reference for all purposes the full disclosure of co-pending U.S. patent application Ser. No. 16/588,889, filed concurrently herewith, entitled "SYSTEM AND METHODS FOR SECURING ROLE CREDENTIALS".

BACKGROUND

In modern computing systems and environments, there is an increasing importance that is being placed on system security. In many computing systems, such as those that involve virtualized computing environments where a plurality of guest virtual machines/instances can be hosted on shared physical host machines, security of data and credentials associated with a guest virtual machine instance is of concern. As an example, guest virtual machines/instances use credentials to interact with other systems and multiple guest virtual machines/instances can be instantiated on the same hardware server. Accordingly, to ensure that one guest virtual machine/instance is unable to access credentials of another guest virtual machine/instance is complex and involves a significant amount of effort.

BRIEF DESCRIPTION OF THE DRAWINGS

Various techniques will be described with reference to the drawings, in which.

DETAILED DESCRIPTION

Figure 1:
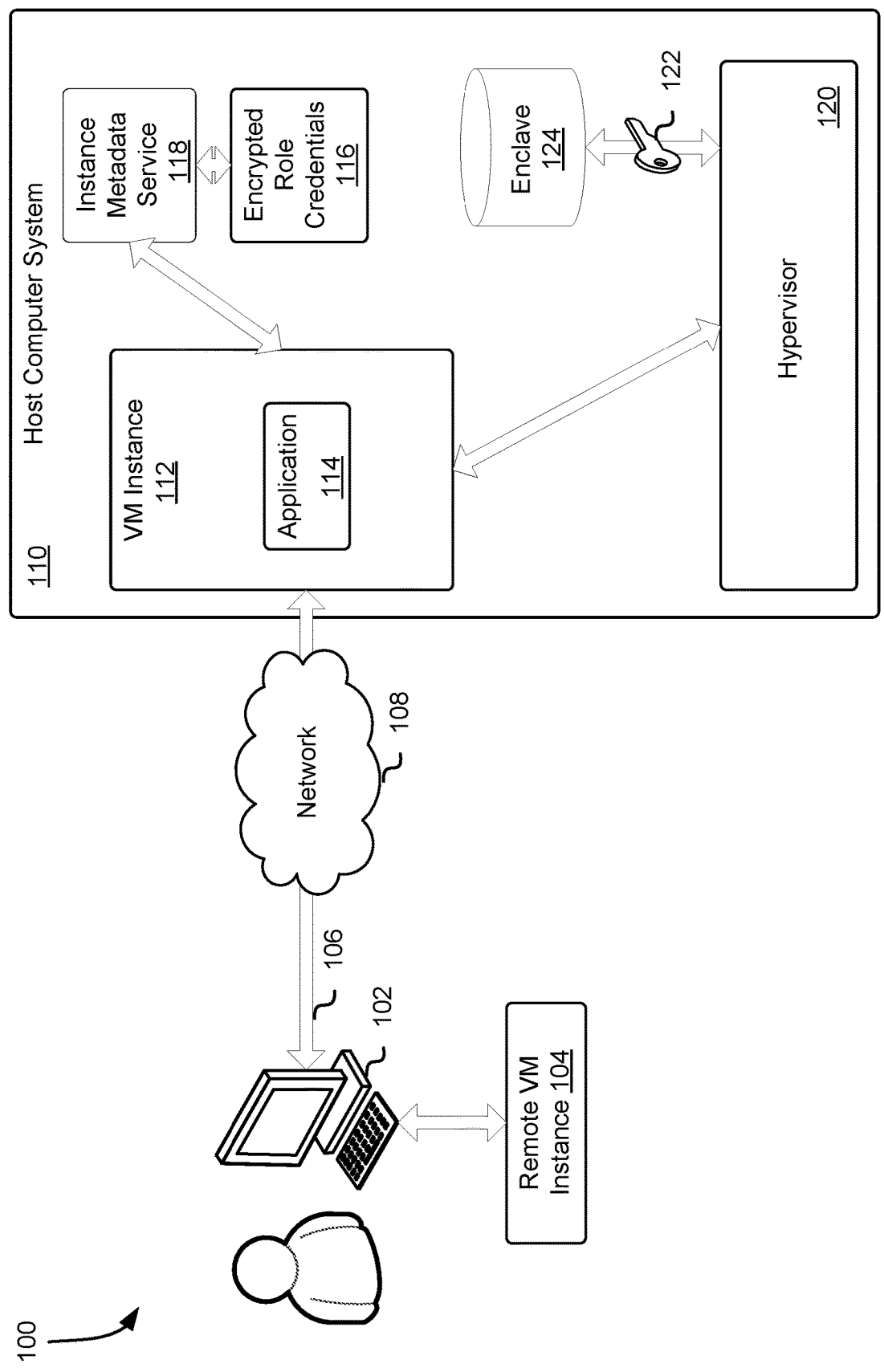
FIG. 1 illustrates an example environment between a computing device and a host computer system, in accordance with at least one embodiment.

Techniques described and suggested herein include methods, systems and processes for providing secure access to role credentials associated with a virtual machine instance (referred herein as "VM instance") and/or the applications that are executing on a single physical host machine in distributed and/or virtualized computer systems and executable code operating thereon. That is, an application running within a VM instance in a computing environment can obtain role credentials to access certain web services or computing resources associated with the computing environment. When provided with role credentials that are encrypted, the application running with the virtual machine can obtain keys to decrypt the encrypted role credentials through the use of an enclave.

In an example, a request to launch a VM instance is received by a control service/plane operating in a computing resource service provider environment. The request to launch the VM instance can indicate a role having a corresponding set of permissions able to be exercised by assuming the role (e.g., by presenting proof of authority to assume the role, such as described in more detail below). The workflow being performed can enable the VM instance to assume the role without having access to the role credentials in plaintext form. Subsequently, an enclave can also be launched on the hardware server. A key that is used to decrypt encrypted role credentials is generated. The key can be generated specifically for the VM instance and the role. The enclave can then store the key such that the VM instance uses the enclave to sign requests pursuant to the role. Once the requests are signed, applications running on the VM instance are then able to access one or more web services and/or computing resources in the computing resource service provider environment.

In an embodiment, encrypted role credentials can be provided to the VM instance. The control service/plane submits a request to obtain the encrypted role credentials. The encrypted role credentials can include at least three components: an access key identifier (e.g., identifier for the credential), secret (e.g., secret key used to sign requests associated with the role), and an encrypted token (e.g., an encrypted binary large object (blob) that is provided that has all the information about the role). The secret can be encrypted by using the key that was previously derived. As will be described in more detail throughout the disclosure, the key uses an instance identifier or at least one or more tags associated with the instance to ensure that credentials are only decrypted using the correct enclave associated with the VM instance. Each tag can be a combination of key and values that enable users or customers to categorize a plurality of VM instances. Moreover, the encrypted role credentials are then delivered to an Instance Metadata Service (IMDS). The IMDS can be a service that stores the encrypted role credentials as metadata. The IMDS is associated with the instance such that the VM instance can submit a call or request to the IMDS to obtain the encrypted role credentials.

Furthermore, after the key is stored in the enclave, an application running within the VM instance can be provided with the encrypted role credentials from the IMDS. The key that was previously stored in the enclave can be used to decrypt the encrypted role credentials. That is, a user device running a VM instance can send a request to access a web service. The request can be an application programming interface (API) call that is routed to a computing device running code of a Software Development Kit (SDK) associated with the VM instance. In an embodiment, the computing device running the code of the SDK provides the encrypted role credentials via the IMDS. The computing device running the code of the SDK can then send a request to the enclave to generate a signature for the request. Specifically, the computing device running the code of the SDK can send a GET request to the enclave to obtain a signature for the request. The GET request can include the original request (e.g., request for the web service) and further includes the encrypted role credentials which includes: the access key identifier, the encrypted secret, and the token. The enclave then generates a signature in response to the GET request and the signature is returned to the computing device running the code of the SDK so that it can send the signed request to the web service such that resources or access is provided to the user device.

Techniques described and suggested herein provide many technical advantages to the security of role credentials in a technical environment. In some environments, role credentials are provided when a user device has access to an application running within a VM instance. The user device can access, from the IMDS, the role credentials. One or more Identity and Access Management (IAM) policies are typically used to restrict the use of these role credentials by using Internet Protocol (IP) address whitelists. However, updating and tracking the IP address whitelists can be cumbersome in an environment with large amounts of active VM instances and could tie up large amounts of computing resources.

The techniques described herein result in the role credentials being stored in an enclave. The enclave is generated along with the launch of the instance such that it is used to securely store the keys necessary to decrypt an encrypted role credential associated with the instance. By launching an enclave to be specifically associated with a launched instance, the enclave can be a secure storage area for keys that are used to decrypt encrypted role credentials. This way, if a VM instance is compromised, the role credentials are not compromised. Even if the role credentials are misappropriated, the role credentials are useless outside of the VM instance. As a result, not only would the amount of computing resources needed to potentially track all the IP addresses associated with a VM instance to restrict use of the credentials be reduced, but also provide for an extra layer of protection for the role credentials.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

FIG. 1 illustrates an example environment 100 where an enclave 124 can be generated for a VM instance 112 by a controlling domain such as a hypervisor 120 within a host computer system 110 environment. A user device 102 can connect to a host computer system 110 via a connection 106 across a network 108. The user device 102 can be a remote VM instance 104 running on one or more remote computer systems, or a software program that runs on the user device 102. The user device 102 can be implemented with a graphic user interface (GUI) that can obtain input from a user. The command or commands to connect to the host computer system 110 can originate from an outside computer system and/or server, or can originate from an entity, user or process on a remote network location, or can originate from an entity, user or process within the computer system, or can originate from the user device 102, or can originate as a result of a combination of these and/or other such entities. Although only one host computing system 110 is depicted in FIG. 1, there can be additional host computer systems (e.g., one or more host computer systems) in the environment 100.

The user device 102 can request connection to the host computer system 110 via one or more connections 106 and, in some embodiments, via one or more networks 108 and/or entities associated therewith, such as servers connected to the network, either directly or indirectly. The user device 102 can request access to the host computer system 110 can include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network 108 can include, for example, a local network, an internal network, a public network such as the Internet, a wide-area network, a wireless network, a mobile network, a satellite network, a distributed computing system with a plurality of network nodes and/or the like. The network 108 can also operate in accordance with various protocols, such as those listed below, Bluetooth, WiFi, cellular network protocols, satellite network protocols and/or others.

The user device 102 can request access to the host computer system 110 within a distributed and/or virtualized datacenter environment 100 provided by a computing resource service provider. The computing resource provider can also provide access to one or more computer services such as additional virtual machine instances, automatic scaling groups, file-based database storage systems, block storage services, redundant data storage services, data archive services, data warehousing services, user access management services, content management services and/or other such computer system services as can be running thereon. The computing resource service provider can also provide access to computer system resources such as user resources, policy resources, network resources and/or storage resources. In some distributed and/or virtualized computer system environments, the resources associated with the computer services can be physical devices, virtual devices, combinations of physical and/or virtual devices or other such device embodiments. In some embodiments, the one or more host machines can be physical machines located within the computer system environment.

The user device 102 can request to launch a VM instance 112 to run on the host computer system 110 which can be one of one or more VM instances running on the host computer system 110. The VM instance 112, or in some instances referred to as an instance, virtual machine instance, or virtual instance, can be launched on the host computing system 110 (e.g., a hardware server). The VM instance 112 can be instantiated by the user device 102, or can be a VM instance that was previously running. The VM instance 112 can be connected to a controlling domain such as a hypervisor 120 which can be configured to manage and/or provide access by the VM instance 112 to one or more system resources on the host computer system 110 including, but not limited to, access to computer system memory, access to central processing unit (CPU) time, access to disk storage, access to specialized hardware and other such resource access. In some embodiments, the hypervisor 120 can provide access to and manage the system resources on the behalf of a plurality of VM instances running on the host computer system 110.

When a VM instance 112 is launched, it can be launched with metadata indicating that the VM instance 112 is associated with a role. The VM instance 112 is associated with the role based on information indicating the role in the request to launch the VM instance 112. In another embodiment, the VM instance 112 can be assigned a role using information from a database. In an embodiment, the role can be associated with the VM instance 112 after the VM instance 112 has launched. but the customer can assign the role later. In some embodiments, the VM instance 112 can also be launched with metadata indicating the scope and type of access that is required, as well as metadata indicating authorized users, methods of authentication, privileges of the application and/or other such metadata.

In an embodiment, the user device 102 causes an enclave 124 to be instantiated for the VM instance 112 on the host computer system 110 (e.g., the hardware server). The enclave 124 can be configured to provide a secure storage area for keys associated with decrypting encrypted role credentials for VM instances with minimal alterations to the guest operating system running on the VM instance 112 by keeping most of the functionality within the hypervisor 120 and facilitating utilization of the secure storage area by applications using hypervisor application programming interface (API) calls. As an example, an enclave is a module, trusted execution environment, and/or service under the control of a hypervisor which can be configured to at least receive requests from applications running on guest virtual machines under the control of the hypervisor to use the necessary keys associated with decrypting encrypted role credentials for the applications to access web services and/or resources. An enclave can be comprised of one or more storage areas, processes and/or other such resources. The enclave can run within, or under the control of, the hypervisor, and can only be accessible via the hypervisor.

The VM instance 112 can be launched to have access to the enclave 124 (e.g., secure storage area). To have access to or be associated with the enclave 124, a hypervisor 120 can be updated to expose the enclave 124 to the VM instance 112 and map the enclave 124 to the VM instance 112 so that the VM instance 112 can communicate with the enclave 124. The hypervisor 120 can us mapping information to provide information about the VM instance 112 to the enclave 124 and since the hypervisor 120 is a trusted resource, the enclave 124 also trusts that the VM instance 112 requesting signatures is a trusted entity. The communication between resources can be performed using domain sockets. In order to protect the keys from access by other applications on the host computer system 110, the computer system can store the keys in an enclave 124 location maintained by the hypervisor 120. Access to the keys 122 is requested by the application 114 using an identifier that, if verified by the hypervisor 120 can allow the release of the keys 122 from the enclave 122 for use by the application 114. If the identifier is not verified, the keys 122 cannot be released by the enclave 124 for use by the application.

In some embodiments, the enclave 124 can be hidden from the other VM instances on the host computer system 110 and in some embodiments, the enclave 124 can appear as any other instance on the host computer system 110. The enclave 124 can also be referred to herein as a secret VM instance, a secret instance and/or other such references. The enclave 124 can be a lightweight or simplified instance configured with the minimal functionality required to manage keys for the VM instance 112 and, in some embodiments, to manage data and/or other resources. In some embodiments, in lieu of an enclave 124, the user device 102 can use a web service that performs encryption operations. The enclave 124 can be a set of instruction codes that allow for regions of memory to be private. These regions of memory can be protected and are unable to be accessed by processes outside of the enclave 124 itself. The enclave 124 can be a subsystem to which the VM instance 112 can submit requests to cause the enclave 124 to perform various operations using a key protected from access from the VM instance 112. The operations can be cryptographic operations (e.g., encryption, decryption, attestation, digital signing, etc).

In some embodiments, a new enclave is instantiated for each VM instance launched. In some embodiments, the hypervisor 120 can instantiate an enclave 124 that is shared by a plurality of VM instances and that is configured to receive metadata from launched instances and to manage keys for the plurality of VM instances. In an embodiment, the enclave 124 or a pool of enclaves can be previously generated on the host computer system 110 and the user device 102, after launching the VM instance 112, is assigned to the enclave 124 from the pool of enclaves.

In an embodiment, the application 114 running on the VM instance 112 can initiate communication to the enclave 124 by first sending a request to access one or more web services. The request indicates that encrypted role credentials 116 are to be provided from an Instance Metadata Service (IMDS) 118. In some embodiments, the IMDS 118 can also be described as an instance metadata manager or an instance data manager, or the like. In an embodiment, the encrypted role credentials 116 are stored as metadata associated with the VM instance 112. Role credentials 116 are used throughout this disclosure for the purpose of illustration as various embodiments can include other types of credentials such as cryptographic keys, bearer tokens, passwords, other secrets, etc.

As briefly noted above, each VM instance 112 can be associated with various metadata (e.g., instance data) that can be used to configure or manage the instance. This metadata can be determined based at least in part on configuration parameters describing the VM instance 112. Metadata can also include various information provided by a customer for customizing or managing the instance, and such customer-generated metadata can be arbitrary (e.g., freely definable, and not necessarily connected with the operation of the instance itself). Although the term "metadata" is used herein, other terms such as "configuration data," "instance data," or "instance metadata" can be used interchangeably to refer to the same data. Some examples of metadata include hardware specifications of the instance (e.g., the number of virtual central processing units (CPUs), memory, storage capacity, etc.), network information associated with the instance (e.g., hostnames, Internet Protocol addresses, networking interface information, etc.), and other information corresponding to the instance, such as operating system type, instance architecture (e.g., 32-bit or 64-bit). Other examples of metadata include data (e.g., metadata) specific to operation of external services connected with or incident to the operation of the VM instance 112.

Again, the encrypted role credentials 116 as described above, can be stored as metadata and provided, when requested, by the IMDS 118 associated with VM instance 112. The encrypted role credential 116 can then be sent along with the request to access web services, generated by the application 114 running on the VM instance, to the enclave 124 such that the enclave 124 can be used to generate a signature for the request. The enclave 124 includes the previously stored keys 122 specific for the VM instance 112 such that the keys 122 are used to decrypt the encrypted role credentials 116 so that a signature can be generated.

In order to protect the keys from access by other applications on the host computer system 110, the computer system can store the keys in an enclave 124 location maintained by the hypervisor 120. Access to the keys 122 is requested by the application 114 using an identifier that, if verified by the hypervisor 120 can allow the release of the keys 122 from the enclave 122 for use by the application 114. If the identifier is not verified, the keys 122 cannot be released by the enclave 124 for use by the application.

In some embodiments, the hypervisor 120 can provide the application 114 running on the VM instance 112 with a uniform resource locator (URL) or a uniform resource identifier (URI) that can refer to a service such as a webserver on the enclave 124 that the application 114 running on the VM instance 112 can use the URL or URI to access the enclave 124. In such embodiments, a computing device running code of a modified Software Development Kit (SDK) can intercept all communications to the provided URI or URL to prevent direct communications between the application 114 on the VM instance 112 and the enclave 124. In such embodiments, the computing device running the code of the SDK can obtain/receive the encrypted role credentials and subsequently send a request to the enclave 124 to obtain the signature. Once the signature is obtained the computing device running the code of the SDK then sends the signed request to the web service on behalf of the application 114 running on within the guest instance 112.

Figure 2:
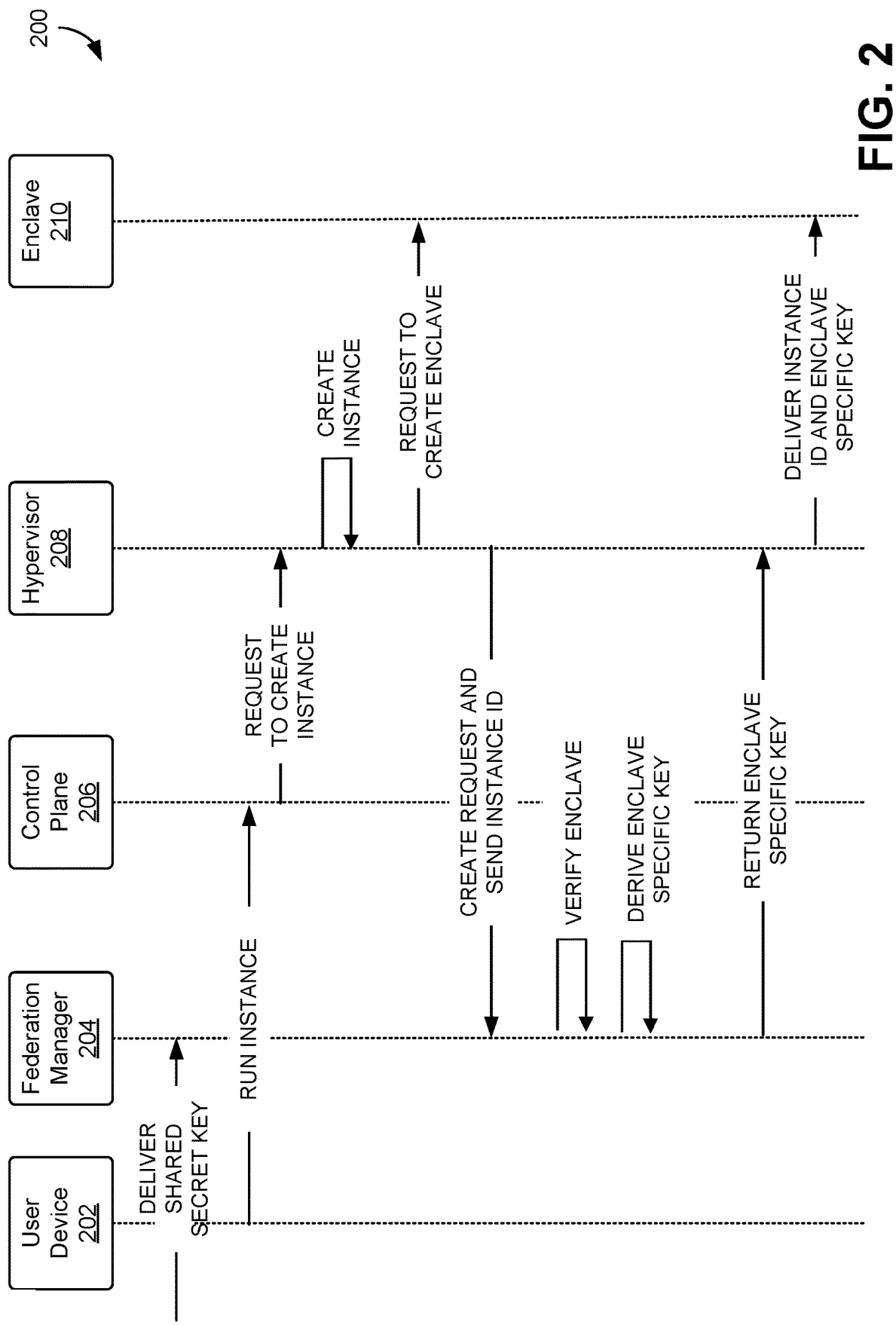
FIG. 2 illustrates an example process in which keys used to decrypt encrypted role credentials are stored in an enclave can be implemented, in accordance with at least one embodiment.

FIG. 2 illustrates an example process 200 in which keys used to decrypt encrypted role credentials are stored in an enclave 210 as described herein at least in connection with FIG. 1 and in accordance with at least one embodiment. That is, as described in FIG. 2, a shard secret key (K) can first be delivered from a key management service (not depicted in FIG. 2 but described in more detail with respect to FIG. 7), for instance, that can be used to generate an enclave specific key to decrypt role credentials. As an example, a first step in the process 200 can include delivering a shared secret key (K) to a Federation Manager (FM) 204. The FM 204 can be a manager or service that enables one or more service providers and identity providers such that resources are shared amongst the providers. The shared secret key (K) can be delivered to the FM 204 via a Key Management Service (KMS) (not depicted in FIG. 2). This shared secret key (K) can be not be specific to an instance, but rather specific to the user 202 or customer with access to resources associated with the computing resource service provider.

Furthermore, as illustrated in FIG. 2, in an embodiment, a user device 202 sends a request to launch a virtual machine/instance which has an associated role. The request is received by a control service/plane 206 of the computing resource service provider environment, which then can subsequently send another request (such as an API call) to a hypervisor 208 to launch the VM instance. The hypervisor 208 then can launch the VM instance requested by the user 202 and since this VM instance has a role associated with it, the hypervisor 208 can also create an enclave 210. The enclave 210 can be created specifically for the VM instance and the role associated with the VM instance either synchronously or asynchronously. In an alternate embodiment, the enclave 210 is not a one to one mapping to the VM instance. That is, in an alternate embodiment, the enclave can be created to share its resources/secure storage area with a plurality of VM instances. In yet another alternate embodiment, there can be a plurality of enclaves 210 that are generated for a single VM instance. Information pertaining to how a VM is mapped to an enclave can be stored in a mapping table in the hypervisor.

In an embodiment, the hypervisor 208 first verifies the hash of the launched instance and sends a request to FM 204 for an enclave specific key to be stored in the enclave 210. (In an alternate embodiment, instead of verifying the hash of the launched instance, the hypervisor 208 can deliver a shared secret to the enclave 210 and FM 204.) The hypervisor 208 can send an attestation request to the FM 204. The attestation request can include information a signature for hash and signature for the enclave which proves that the enclave is correct and the associated VM instance identifier (Instance-ID). The FM 204 can first verify this information for the enclave 210 and after that, the FM 204 can derive an enclave specific key (Ekey). The enclave specific key (Ekey) Ekey can be derived as follows: Ekey=HMAC-SHA256(K, Instance-ID). That is, the enclave specific key (Ekey) can be derived by applying a Hash-based Message Authentication Code (HMAC) using the SHA256 hash function to the shared secret (K) previously received and an identifier of the VM instance. The FM 204 can return the enclave specific key (Ekey) to the hypervisor 208. Subsequently, the hypervisor 208 can then deliver the identifier of the VM instance and the enclave specific key (Ekey) to the enclave 210. The enclave 210, then subsequently stores the enclave specific key (Ekey) and the identifier of the VM instance. In an embodiment, the identifier of the VM instance is used to identify which instance the enclave specific key (Ekey) was generated for.

Figure 3:
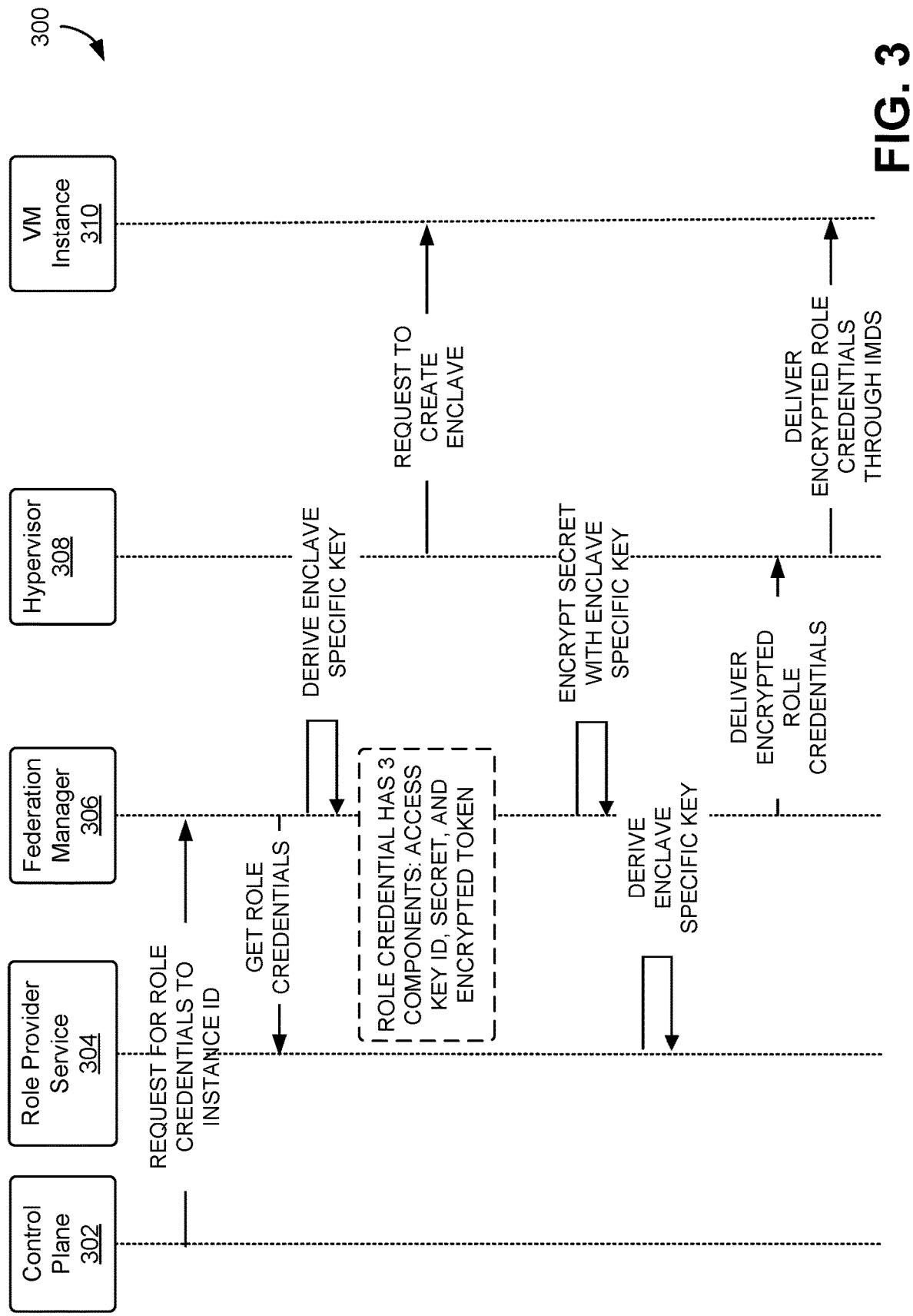
FIG. 3 illustrates an example process in which encrypted role credentials are delivered to a virtual machine (VM) instance can be implemented, in accordance with at least one embodiment.

FIG. 3 illustrates an example process 300 in which encrypted role credentials are delivered to a VM instance can be implemented in a computing resource service provider environment. In an embodiment, the control service/plane 302 of the computing resource service provider environment asks, makes a call, or obtains from the FM 306 the encrypted role credentials for a VM instance based on identifying that the VM instance being associated with an enclave. Note that after the first call, FM 306 will continue to refresh these credentials before expiration since role credentials are active for a short amount of time (e.g., temporary). After the call, the FM 308 calls a role credential provider service 304 to obtain credentials for the role associated with the VM instance. Similar to the description above, the FM 306 can derive the enclave specific key (Ekey) as follows: EKey=HMAC-SHA256(K, Instance-ID) if the enclave specific key has not been derived previously. In an embodiment, the role credentials comprises of at least three items: a) an access key identifier (AccessKeyID), b) secret, and c) an encrypted token. The FM 306 can encrypt the secret with the enclave specific key (EKey). An authenticated model such as AES-GCM (Advanced Encryption Standard-Galios/Counter Mode) can be used to encrypt the secret using the enclave specific key (EKey). The use of an instance identifier (e.g., Instance-ID) in key derivation ensures that credentials can only be decrypted with the correct enclave. Thereafter, these encrypted role credentials are delivered to the IMDS (not depicted in FIG. 3, but described in FIGS. 1-2). The IMDS is associated with the VM instance and can be configured to store the encrypted role credentials as metadata for the VM instance. The encrypted role credential provided to the IMDS, as discussed above, now comprises of: a) an access key identifier, b) an encrypted secret, and c) an encrypted token.

Figure 4:
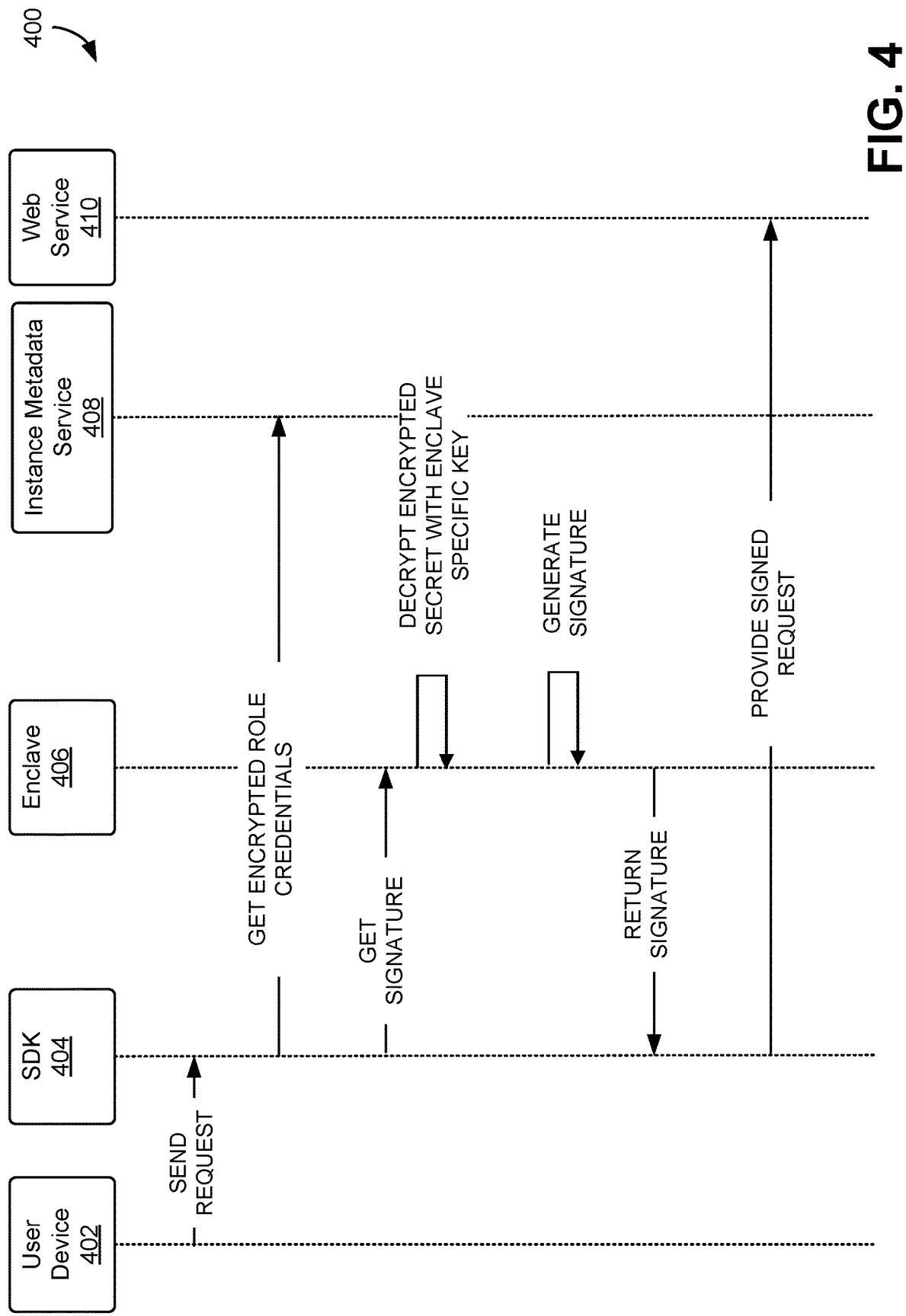
FIG. 4 illustrates an example process in which encrypted role credentials are decrypted using keys from an enclave can be implemented, in accordance with at least one embodiment.

FIG. 4 illustrates an example process 400 in which encrypted role credentials are decrypted using keys from an enclave 406, in accordance with at least one embodiment. In an embodiment, a user device 402 running a VM instance generates a request for a web service 410. That is, the user application 402 can send a request in an attempt to access a web service 410, one or more web services, or computing resource. This request can go through a computing device running the code of a modified SDK 404 associated with the environment. The computing device running the code of the SDK 404 can first obtain the role credentials from IMDS 408 and determine whether the role credentials are encrypted or decrypted. If the role credentials are encrypted, subsequently, the computing device running the code of the SDK 404 can then send another request (e.g., GET request) to an enclave 406, which is associated with the VM instance that generated the request for the web service, to generate a signature for the request. The GET request can include the original request for the web service generated by the user device 402, the access key identifier, the encrypted secret, and the token.

As noted with respect to FIG. 2, the enclave 406 was previously instantiated specifically for the VM instance to store the enclave specific key (EKey) that can be used to sign requests for the VM instance to access web services. The request submitted by the user device 402 can include information or identifiers associated with the instance such that the correct enclave 406 can be asked to provide the keys. The computing device running the code of the SDK 404 asks the enclave 406 to generate the signature. The enclave 406 can decrypt the encrypted secret using the enclave specific key (EKey) that was previously stored in the enclave 406 to generate the signature. The plaintext credential can be used by the enclave 406 to generate the signature. The signature can be generated by the enclave 406 with information that cryptographically protects the request based on the credentials provided to the enclave 40006. In an embodiment, the credential is encrypted and the information is a digital signature generated using the decrypted credential. In an alternate embodiment, the request is encrypted with the credential. The signature can then be returned to the computing device running the code of the SDK 404 and the computing device running the code of the SDK 404 can then send the signed request to the web service 410 such that the user device 402 can access the service 410 and the resources associated with the web service 410. In some embodiments, the response to the request may be canonicalized, by the enclave 406 and provide the canonicalized request back to the user device 402.

In an alternate embodiment, the shared secret key (K) that was provided from a key manager to the FM 204, as described in FIG. 2, can be rotated. There are many possible mechanisms to rotate the shared secret key (K). As an example, key rotation can be performed by modifying the encrypted secret of the encrypted role credential. That is, instead of directly encrypting the secret, a binary large object (blob) is encrypted containing two items: secret and a new encryption key (NewEkey). The NewEKey can be derived using the same mechanism used for derivation of the current enclave specific key (Ekey). For example, NewEKey=HMACSHA256(NewK, Instance-ID). This blob is then encrypted using the current key Ekey. When the role credentials are received on the VM instance, the encrypted blob is passed to the enclave. The enclave decrypts the blob using current key Ekey to get access to NewEKey.

Figure 5:
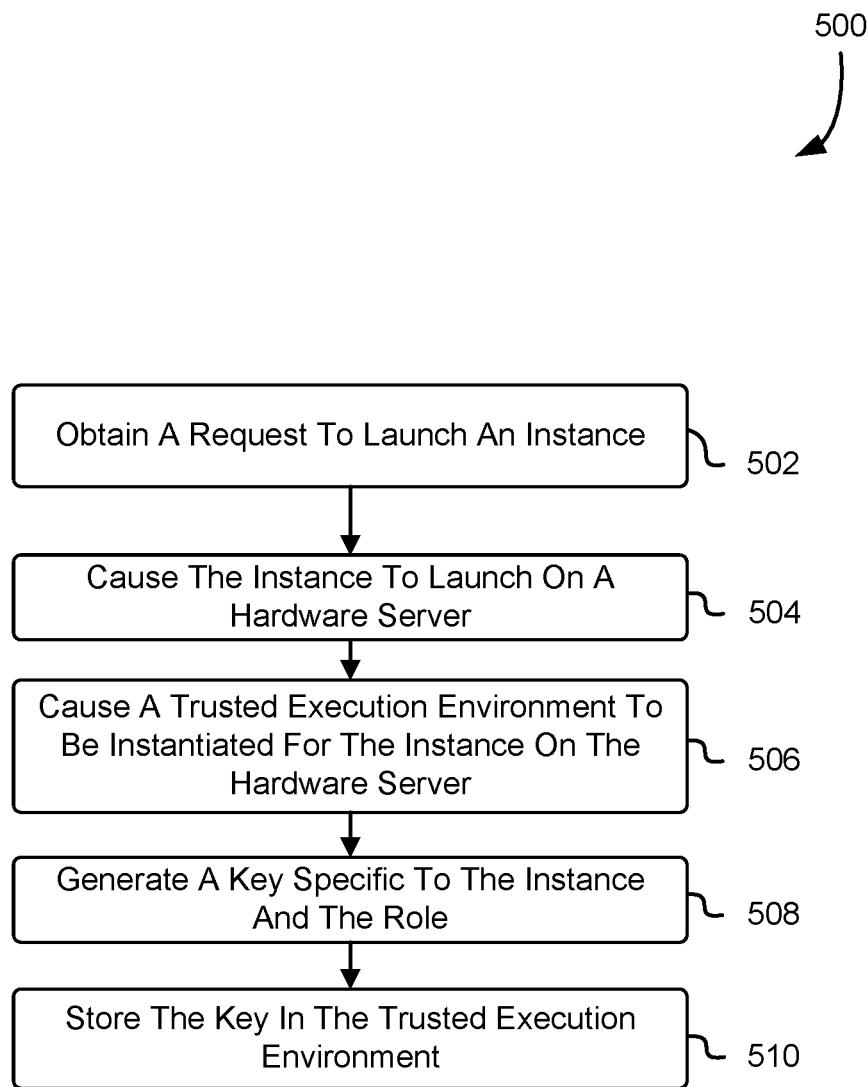
FIG. 5 illustrates a process for generating keys to store in an enclave, in accordance with at least one embodiment.

FIG. 5 illustrates a process 500 for generating keys to store in an enclave in a computing resource service provider environment, in accordance with at least one embodiment. At step 502, an entity, such as an control plane/service or other resource capable of receiving and/or processing requests and/or changes thereto, receives a request to launch an instance. A user device or other interested entity can send the request to the control plane/service associated with the environment to request that an instance be launched. The instance can be a virtual machine, VM instance, or the like that operates on a host computer system in the computing resource service provider environment. The request specifies that the VM instance is associated with a role. At step 504, the entity such as a hypervisor (or another entity connected with the entity receiving the request to launch an instance in step 502) launches the VM instance. That is, the control service/plane sends a request to the hypervisor such that the hypervisor receives the request and causes an VM instance to be launched on the host computer system. The host computer system can also be described as a hardware server, hardware device, and the like.

At step 506, an enclave is also instantiated for the VM instance on the host computing system. In other words, as the hypervisor receives the request to launch the VM instance, the hypervisor is also requested to launch or instantiate an enclave and associate the enclave with the launched VM instance. In an alternate embodiment, the request to launch the VM instance does not include information on launching the enclave. Rather, another request is sent from the user device to generate a VM instance specific enclave. In an embodiment, the enclave is generated synchronously with the launch of the VM instance. In an alternate embodiment, the enclave can be generated asynchronously after the launch of the VM instance. At step 508, after the VM instance is launched and the enclave is launched, a key (e.g., enclave specific key) is generated specifically for the VM instance and the role associated with the VM instance. That is, the enclave specific key can be an encryption key that is specific for the VM instance (e.g., an enclave specific encryption key) that, when generated, can be used to decrypt encrypted role credentials associated with the VM instance. In other words, the enclave specific key can be used to sign off on requests from applications running on the VM instance that can want seek access to one or more web services in the environment.

At step 510, the enclave specific key that was generated in step 508 is stored in the enclave. As can be contemplated, the enclave can have a direct connection or a communication channel with the instance using a computing device running the code of a SDK associated with the VM instance and such requests for web services stemming from applications running on the VM instance can be received by the enclave. In other embodiments, the hypervisor can be the intermediate communication channel between the enclave and its associated VM instance via a virtual socket such that requests are forwarded and/or translated from the user device to the enclave accordingly.

Figure 6:
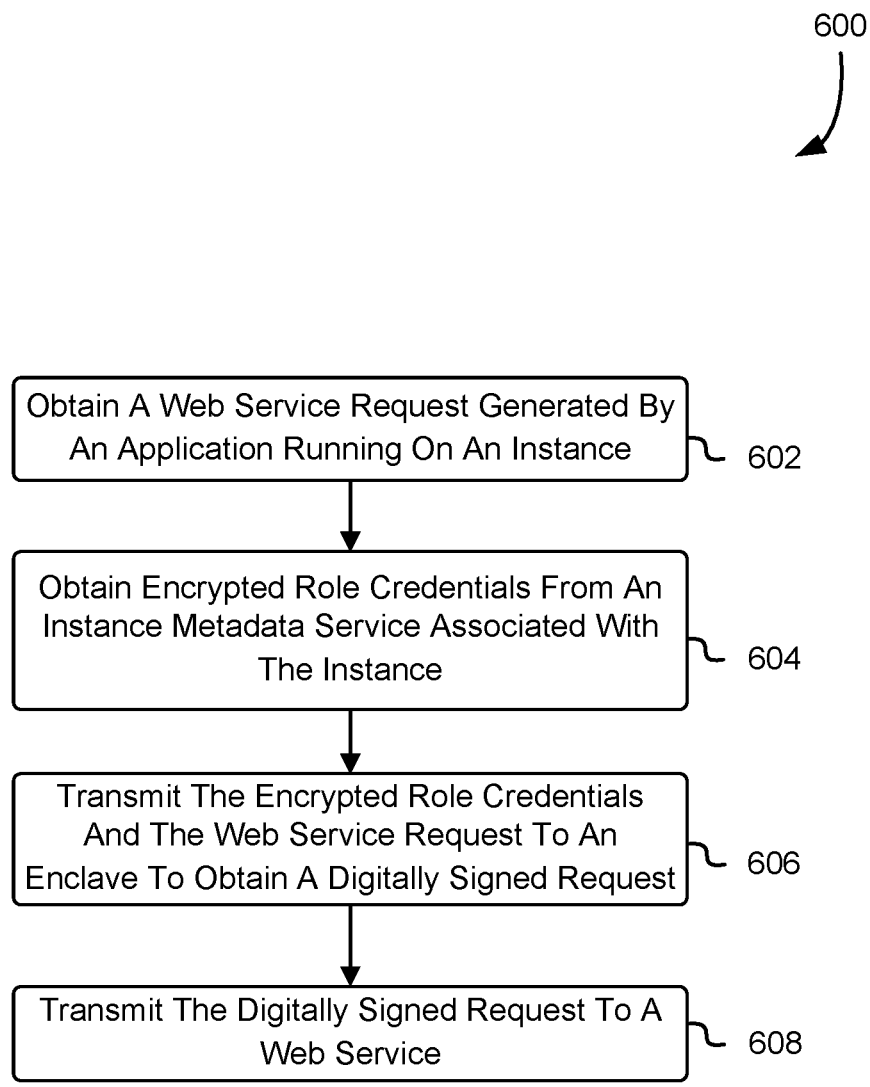
FIG. 6 illustrates a process for using the encrypted credentials through obtaining keys from the enclave, in accordance with at least one embodiment.

FIG. 6 illustrates a process 600 for using the encrypted credentials through obtaining keys from the enclave, in accordance with at least one embodiment. At step 602, an entity, such as a control plane/service or other resource capable of receiving and/or processing requests and/or changes thereto in a computing resource service provider environment, obtains a request to access a web service. A user device can send a request to the control plane/service to request access to the web service or a computing resource. The user device can generate the web service request when running an application on a VM instance. In another embodiment, the request can be generated by the application running on the VM instance and not specifically directed by instructions from the user device. At step 604, a computing device running the code of the SDK obtains the web service request generated from step 602. The computing device running the code of the SDK then sends a second request to obtain encrypted role credentials associated with the VM instance that generated the web service request. The encrypted role credentials can have been previously generated and stored as metadata in an instance metadata service (IMDS) or an instance metadata manager. The encrypted role credentials can then be provided from the IMDS to the computing device running the code of the SDK after processing the second request.

At step 606, the computing device running the code of the SDK can then transmit the encrypted role credentials it received from the IMDS to an enclave. The enclave is a previously generated enclave that is specific to the VM instance that generated the original request for the web service. As described above with respect to FIGS. 1-4, the enclave is secure storage area to store one or more enclave specific keys that can be used to decrypt encrypted role credentials pursuant to the role associated with the instance. In an embodiment, the enclave is a set of security-related instruction codes that are built to define private regions of memory. The contents in the enclave are typically protected and cannot be read or saved by any processes running outside of the enclave. Moreover, at step 606, the computing device running the code of the SDK sends the encrypted role credential and the web service request to the enclave. The enclave, as mentioned above, includes the enclave specific key that can be used to decrypt the encrypted role credentials. Once decrypted, the enclave then can generate a signature for the web service request. The signature can be digital signature on the web service request. At step 608, the digitally signed request can then be transmitted or forwarded to a web service such that the application running on the VM instance can obtain access to the web service.

In an embodiment, the enclave ceases to operate when the VM instance that it's associated with is either suspended or has also ceased its operations. In an alternate embodiment, when the VM instance is in the suspended state or in a ceased operation state, the enclave associated with the VM instance can associate itself with another launched VM instance to provide secure storage for keys for the roles associated with the other launched VM instance.

Figure 7:
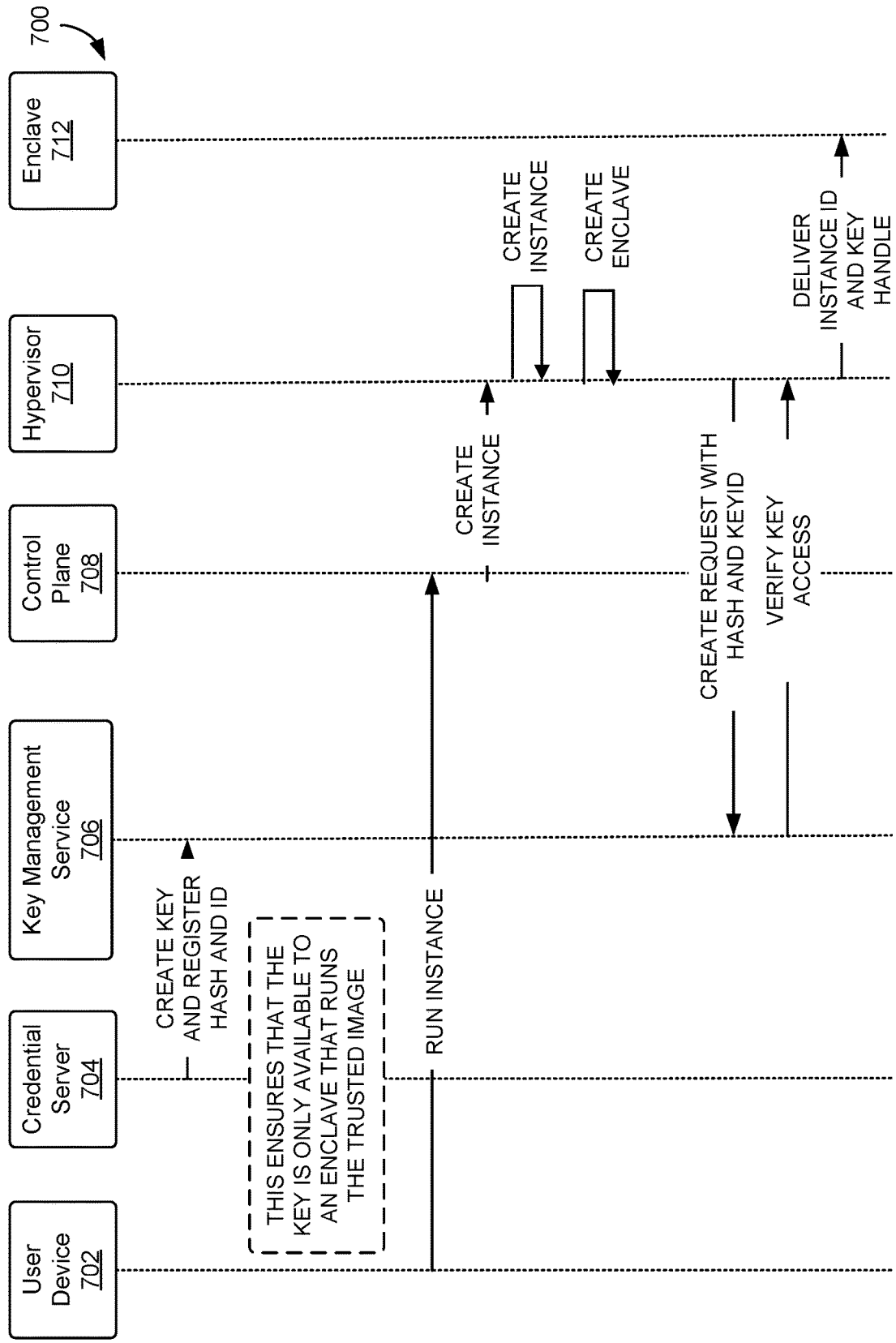
FIG. 7 illustrates an example process in which keys, via a key manager, that are used to decrypt encrypted role credentials are stored in an enclave can be implemented, in accordance with at least one embodiment.

FIG. 7 illustrates an example process 700 in which keys, via a key manager (e.g., key management service 706), that are used to decrypt encrypted role credentials are stored in an enclave can be implemented, in accordance with at least one embodiment. In an embodiment, a key from a key management service 706 is created. The key can be an enclave specific key that is used to decrypt role credentials in an enclave. The key is generated by credential server 704 and is further registered so that its handle or information pertaining to locating the key from the key management service 706 can be delivered by a hypervisor 710 to an enclave 712. The credential server 704 may also be referred to as a credential manager. The registration performs a SHA-256 hash of the enclave image so that the key is only available to an enclave that runs the trusted credential server image.

In an embodiment, after the key is generated, a user device 702 sends a request to launch a VM instance. The request can include specifics that identify the instance having associated role. The control plane/service 708, then receives the request from the user device 702. The control plane/service 702 can then send a request to the hypervisor 708 to launch or create the VM instance. The hypervisor 710 launches the VM instance and since this VM instance has a role associated with it, the hypervisor 710 also creates an enclave. The enclave can be created specifically for the VM instance or, in alternate embodiments, the enclave can be created for a plurality of VM instances. The request for launching a VM instance obtained by the hypervisor can identify that the request for the VM instance to be launched has a role associated with it such that based on the identification an enclave is also instantiated. However, in some embodiments, the hypervisor can obtain a second request separate from the request to launch the VM instance to indicate that an enclave be instated from the launched VM instance. The hypervisor 710 verifies the hash of the launched image and sends a request to the key management service 706 for access to the key that was previously created by the key management service 706. The request is received by the key management service 706 and it verifies that the key can be accessed. This verification can be done by decrypting a binary large object (blob) that was encrypted by the credential server's 704 key. Subsequently, the hypervisor 710 can then deliver the instance identifier and key handle to enclave 712.

Figure 8:
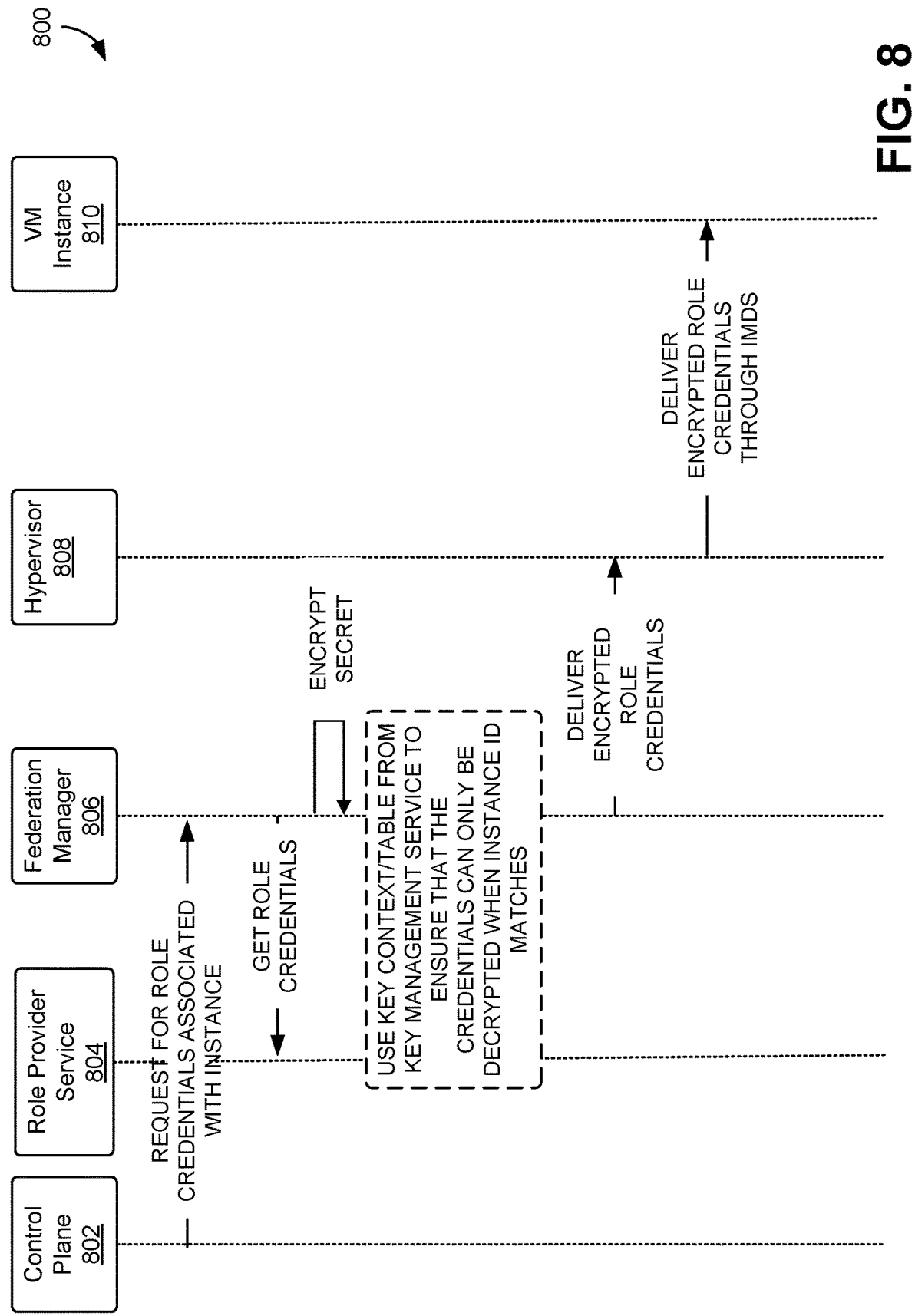
FIG. 8 illustrates an example process in which encrypted role credentials are delivered to a VM instance can be implemented, in accordance with at least one embodiment.

FIG. 8 illustrates an example process 800 in which encrypted role credentials are delivered to a VM instance, in accordance with at least one embodiment. A control plane/service 802 asks the FM 806 to deliver encrypted role credentials. Note that after the first call, FM 806 will continue to refresh these credentials before expiry. FM 806 calls a role credential provider service 804 to get credentials for a role associated with the VM instance 810. In an embodiment, role credentials comprises at least three items: a) an access key identifier (AccessKeyID) b) secret c) encrypted token. FM 806 encrypts the secret with the key generated as described with respect FIG. 7 with a key identifier. FM 806 uses the instance identifier as key context. This ensures that credentials can only be encrypted when instance identifier matches. These credentials are then delivered to the IMDS (not depicted FIG. 8, but as described with respect to FIG. 1).

Figure 9:
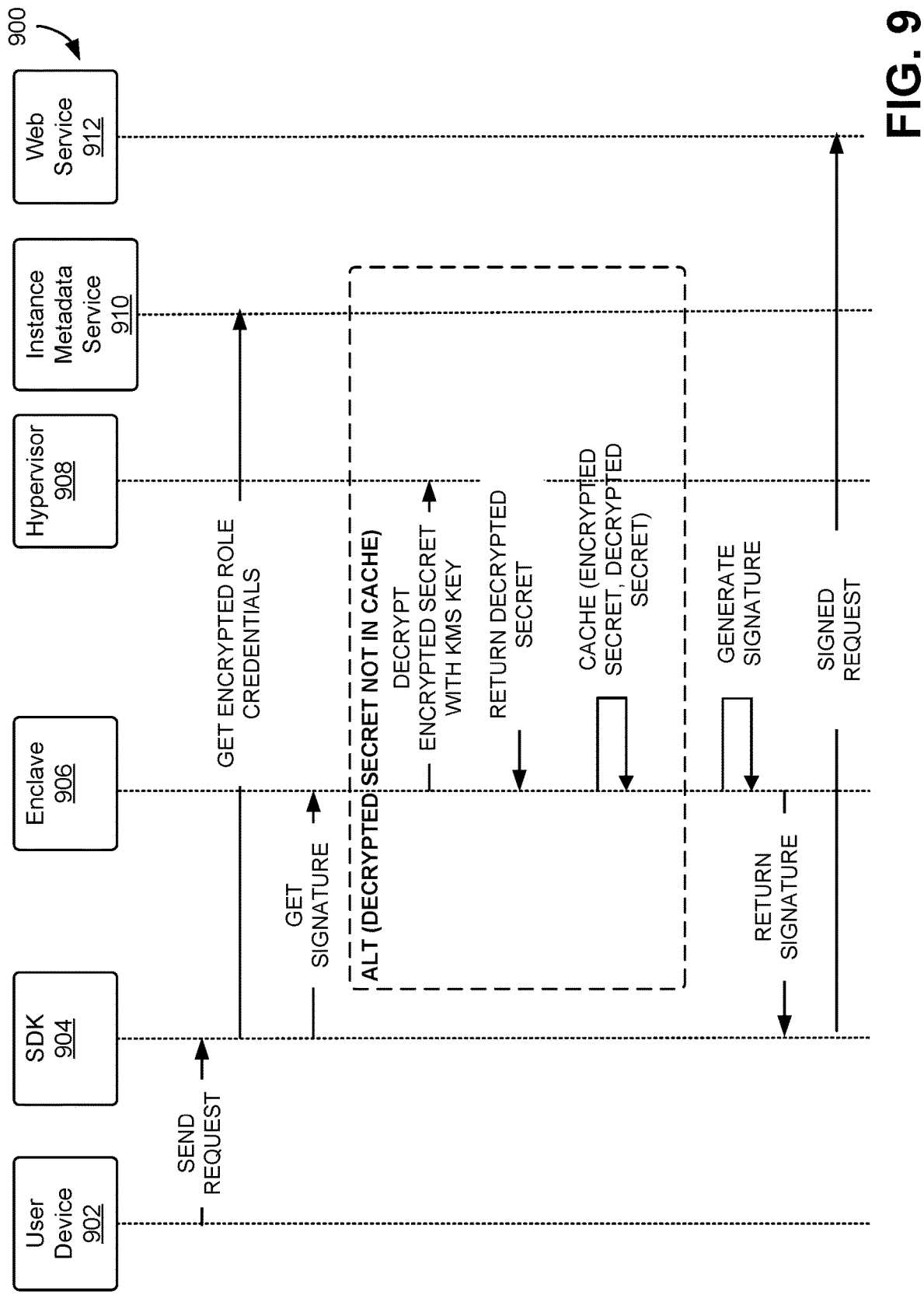
FIG. 9 illustrates an example process in which encrypted role credentials are decrypted using keys from an enclave can be implemented, in accordance with at least one embodiment.

FIG. 9 illustrates an example process 900 in which encrypted role credentials are decrypted using keys from an enclave 906, in accordance with at least one embodiment. Initially, a user device 902 sends a request to a web service 912. This request is intercepted or runs through a computing device running the code of modified SDK 904 first that is associated with the VM instance. The computing device running the code of the SDK 904 gets the encrypted role credentials from IMDS 910. Moreover, in an embodiment, the computing device running the code of the SDK 904 then asks the enclave 906 to generate a signature for the request. If the decrypted secret is not in cache, the enclave 906 makes a request to hypervisor 908 to decrypt the encrypted secret using a key context associated with the identifier of the VM instance. The hypervisor 908 then returns the decrypted secret by calling a decrypt from the key management service (not depicted here in FIG. 9). This decrypted secret can be cached for later use. Caching the decrypted secret can avoid the potential need to call hypervisor 908 and key management service to decrypt the encrypted key which can be a slow operation. Subsequently, the enclave 906 can then generate the signature and the signature is returned to the computing device running the code of the SDK 904. The computing device running the code of the SDK 904 then sends the signed request to the web service 912 such that the user device 902 can access the web service and its associated resources. If the decrypted secret is in cache, then the process of FIG. 9 can require less steps in that once the request is sent to the enclave to obtain a signature for the request, the enclave generates the signature using the decrypted secret previously created.

Figure 10:
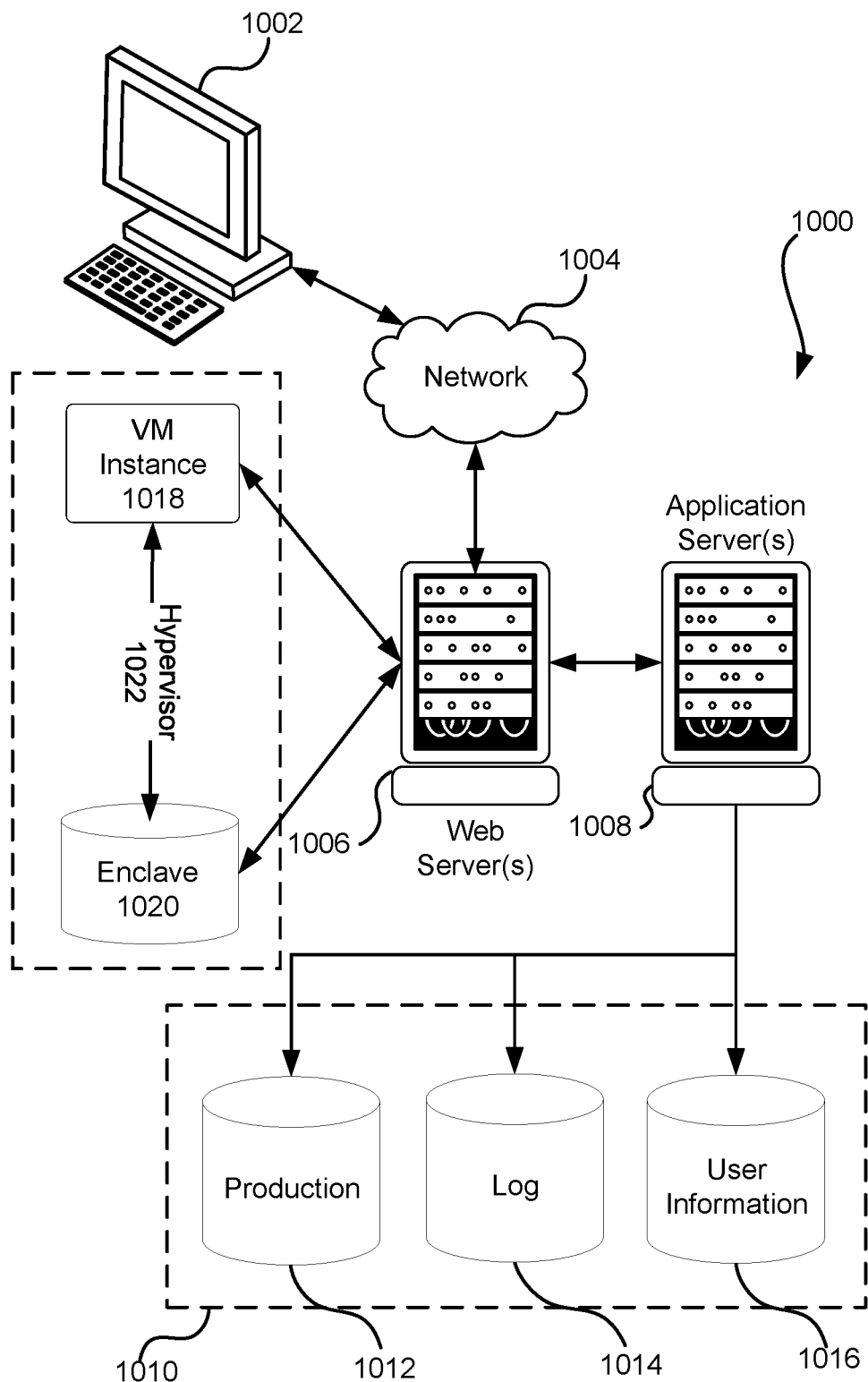
FIG. 10 illustrates an environment in which various embodiments can be implemented.

FIG. 10 illustrates aspects of an example system 1000 for implementing aspects in accordance with an embodiment. As will be appreciated, although a web-based system is used for purposes of explanation, different systems can be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art. The web server can be a hardware server that hosts a virtual machine (VM) instance 1018, a plurality of virtual machines, trusted execution environments (e.g., enclaves) 1020, and at least one virtual machine manager (VMM) (e.g., hypervisor) 1022. As described herein with respect to FIG. 1-9, the VM instance 1018 can be instantiated on the same web server (hardware) 1006 as the enclave 1020 and any communication pertaining to signing web service requests generated by an application running on the VM instance 1018 can be facilitated via a hypervisor 1022.

In an embodiment, the illustrative system includes at least one application server 1008 and a data store 1010, and it should be understood that there can be several application servers, layers or other elements, processes or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which can include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store 1010 also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory including instructions that, as a result of being executed by the one or more processors, cause the system to:
obtain a web service request generated by an application running on an instance;
obtain encrypted role credentials from an instance metadata service associated with the instance;
transmit the encrypted role credentials and the web service request to an enclave to obtain, from the enclave that decrypts a secret in the encrypted role credentials using a key stored in the enclave, a digitally signed request; and
transmit the digitally signed request to a web service.

2. The system of claim 1, wherein the enclave is specifically associated with the instance.

3. The system of claim 2, wherein the secret is decrypted using a key stored in the enclave, wherein the key is determined based at least in part on information from the encrypted role credentials.

4. The system of claim 1, wherein information associated with the web service request identifies the enclave to select to digitally sign the web service request.

5. A method, comprising:
obtaining a request to be submitted by an application running on an instance;
obtaining an encrypted credential that is usable to allow the instance to exercise a privilege associated with the credential;
transmitting the encrypted credential and the request to a trusted execution environment that stores a key to decrypt an encrypted secret in the encrypted credential such that the key is inaccessible to the instance;
obtaining, from the trusted execution environment, a digital signature of the request generated based on the credential; and
transmitting the request and the digital signature to exercise the privilege.

6. The method of claim 5, further comprising selecting the trusted execution environment associated with the instance based at least in part on information associated with the request generated by the application running on the instance.

7. The method of claim 5, wherein the encrypted credential includes at least an access key identifier, the encrypted secret, and an encrypted token.

8. The method of claim 7, wherein the encrypted secret is decrypted using the key stored in the trusted execution environment.

9. The method of claim 8, wherein the trusted execution environment generates a digital signature based at least in part on the decrypted secret.

10. The method of claim 7, wherein the trusted execution environment is a secure environment that is running executable instructions defining a private area by a processor of a hardware server on which the instance is instantiated.

11. The method of claim 7, further comprising sending a second request to an instance metadata service associated with the instance to obtain the encrypted credential based at least in part on information from the request submitted by the application running on the instance.

12. The method of claim 7, wherein the request is a web service request to access resources.

13. A non-transitory computer-readable storage medium comprising executable instructions that, as a result of being executed by one or more processors of a computer system, cause the computer system to at least:
obtain a request and a credential;
provide the request to a trusted execution environment that stores a key specific to the computer system;
obtain, from the trusted execution environment, information that cryptographically protects the request based on a secret from the credential; and
transmit the information to cause the request to be fulfilled.

14. The non-transitory computer-readable storage medium of claim 13, wherein the information that cryptographically protects the request is a digital signature.

15. The non-transitory computer-readable storage medium of claim 13, wherein the credential, in encrypted form, includes at least an access key identifier, a secret, and an encrypted token.

16. The non-transitory computer-readable storage medium of claim 15, wherein the credential, in encrypted form, is obtained from an instance metadata service associated with the computer system.

17. The non-transitory computer-readable storage medium of claim 15, wherein the credential is decrypted using the key stored in the trusted execution environment.

18. The non-transitory computer-readable storage medium of claim 13, wherein the decrypted credential is cached in the trusted execution environment.

19. The non-transitory computer-readable storage medium of claim 13, wherein the key is inaccessible outside of the trusted execution environment.

20. The non-transitory computer-readable storage medium of claim 13, wherein information associated with the request identifies the trusted execution environment with the key to provide the request.

* * * * *